United States Patent [19]
Doyle et al.

[11] Patent Number: 5,659,674
[45] Date of Patent: Aug. 19, 1997

[54] SYSTEM AND METHOD FOR IMPLEMENTING AN OPERATION ENCODED IN A GRAPHICS IMAGE

[75] Inventors: Shaula E. Doyle; Darrin W. Massena, both of Redmond, Wash.

[73] Assignee: Microsoft Corporation, Redmond, Wash.

[21] Appl. No.: 336,427

[22] Filed: Nov. 9, 1994

[51] Int. Cl.$^6$ .................................................. G06T 11/00
[52] U.S. Cl. .................................................. 395/133
[58] Field of Search .............................. 395/50–54, 133, 395/141, 155, 159, 160, 161, 600, 919, 128–132, 326, 333, 334, 335, 339, 348–351; 382/14, 190, 209

[56] References Cited

U.S. PATENT DOCUMENTS

| | | | |
|---|---|---|---|
| 4,463,386 | 7/1984 | Goddard et al. | 358/432 X |
| 5,133,052 | 7/1992 | Bier et al. | 395/133 |
| 5,251,268 | 10/1993 | Colley et al. | 382/14 |

OTHER PUBLICATIONS

Petzold, Charles, *Programming Windows™: The Microsoft Guide to writing applications for Windows 3*, Microsoft Press, Redmond, WA, 1990, pp. 636–649.

*Microsoft Windows Softrware Development Kit: Programmer's Reference, vol. 4: Resources*, Microsoft Corporation, 1987–1992, pp. 23–45.

*Primary Examiner*—Almis R. Jankus
*Attorney, Agent, or Firm*—Seed and Berry LLP

[57] ABSTRACT

A method and system for encoding an operation in a graphics image. The method and system encode the operation as a graphically encoded object that is drawn as part of the graphics image. When rendering the graphics image, the method and system locate the graphically encoded object and perform the operation corresponding to the graphically encoded object. In a preferred embodiment, the graphically encoded object is a polygon of an uncommon color. In the preferred embodiment, the operation performed is to replace the graphically encoded object with a replacement object of the same size and shape as the graphically encoded object. In the preferred embodiment, the graphics image is represented by a metafile that includes plural metafile records. The preferred embodiment enumerates each metafile record to determine whether the record corresponds to the graphically encoded object. If so, then the operation corresponding to the metafile record is performed.

25 Claims, 2 Drawing Sheets

SYSTEM AND METHOD FOR IMPLEMENTING AN OPERATION ENCODED IN A GRAPHICS IMAGE

TECHNICAL FIELD

The present invention relates generally to computer graphics and more specifically to a system and method for encoding an operation in a graphically encoded object.

BACKGROUND OF THE INVENTION

For the last several years, the world of computers, especially personal computers, has increasingly moved toward graphical user interfaces, such as that provided by Microsoft WINDOWS™. Such graphical user interfaces are much easier and more enjoyable to use than non-graphical user interfaces, such as that provided by MS-DOS™. However, such graphical user interfaces require much more memory to store the graphics images used.

Many software designers have taken advantage of the graphical user interfaces by developing application programs that provide new and interesting graphical abilities. Such application programs include drawing or painting programs, like Aldus Freehand™, allow users to create complicated and unique graphics images. Such drawing programs typically enable users to create raster graphics images, that is, graphics images formed by patterns of light and dark picture elements (pixels) in a rectangular array. Many drawing programs include utilities for converting the raster graphics image into a vector graphics image, such as a WINDOWS™ metafile. Rather than being represented by individual pixel values, a vector graphics image is represented by metafile records that describe lines or objects. Metafiles usually take less memory to store an image than does a bitmap. In addition, a metafile is device independent, that is, can be displayed to file the display screen regardless of the pixel density of the display device displaying the graphics image.

Regardless of whether a bitmap or a metafile is used, the prior art graphical application programs lack some flexibility and require much memory. For example, users currently have no way to incorporate dynamic objects, such as working clock faces, into the graphics images that they create. In addition, in order to display 20 complicated objects, such as automobiles, that differ from each other only in a minor detail, such as the radiator grill, the user has to draw all 20 automobiles. Prior art applications have no ability to simply draw one automobile and 20 radiator grills and incorporate the radiator grills into the single automobile graphic object. In addition, prior art application programs do not enable the user to instruct the computer to perform a non-graphical operation, such as emitting an alarm sound when the user draws an alarm clock.

SUMMARY OF THE INVENTION

The invention is directed to a method and system for encoding an operation in a graphics image. The invention encodes the operation as a graphically encoded object that is drawn as part of the graphics image. When rendering the graphics image, the invention locates the graphically encoded object and performs the operation corresponding to the graphically encoded object. In a preferred embodiment, the graphically encoded object is a polygon of a predetermined uncommon color. In the preferred embodiment, the operation performed is to replace the graphically encoded object with a replacement object of the same size, location, and shape as the graphically encoded object.

In a preferred embodiment, the graphics image is represented by a metafile that includes plural metafile records. The preferred embodiment enumerates each metafile record to determine whether the metafile record corresponds to the graphically encoded object. If so, then the graphically encoded object corresponding to that metafile record is not displayed and is replaced by a replacement object. In an alternate embodiment, the graphically encoded object corresponds to a non-graphics operation, such as outputting an alarm sound when the graphically encoded object is found.

DETAILED DESCRIPTION OF THE INVENTION

Figure 1:
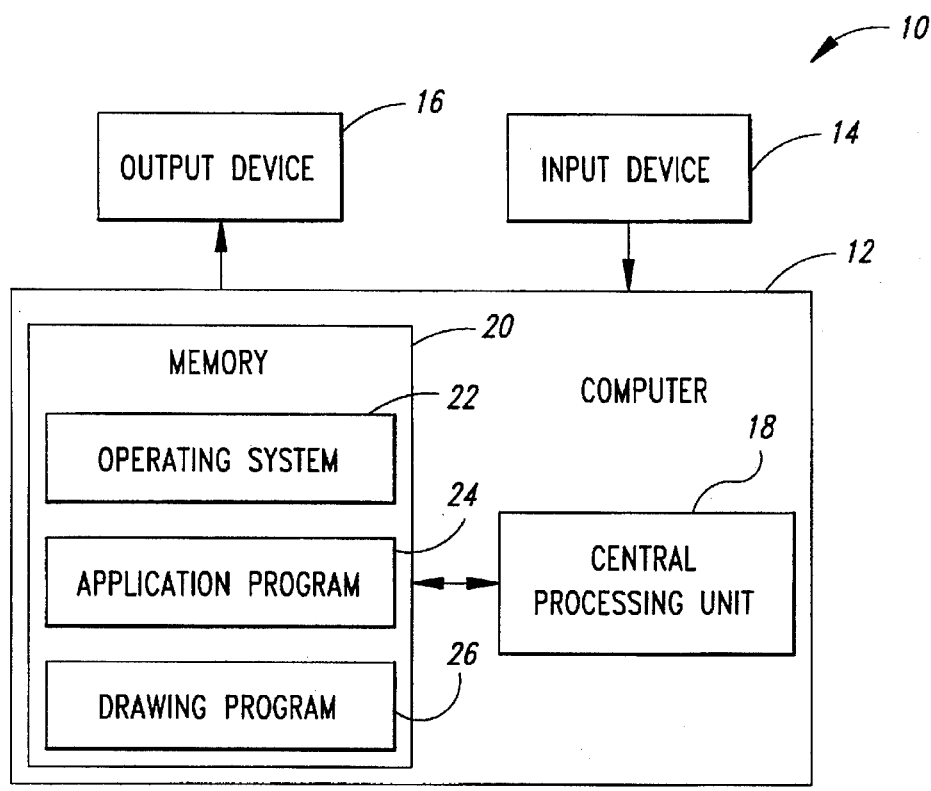
FIG. 1 is a block diagram of a computer system according to the present invention.

The invention is directed to a method and system for encoding an operation in a graphics image. The invention encodes the operation as a graphically encoded object that is drawn as part of the graphics image. When rendering the graphics image, the invention locates the graphically encoded object and performs the operation corresponding to the graphically encoded object. The graphically encoded object can be any graphics object that is predetermined to correspond to a desired operation. The desired operation can be any graphical or non-graphical operation desired to be performed when the graphically encoded operation is found.

By enabling any desired operation to be performed upon finding a graphically encoded object in a graphics image, the invention adds enormous flexibility, and consequently adds value, to graphical computer systems. In one embodiment, the invention enables a graphics image to be drawn that includes multiple graphically encoded objects at positions where a replacement object is intended to be located. When the graphics image is displayed, the graphically encoded objects are replaced by the replacement object.

For example, to display a graphics image with 10 different designs of clocks, all with the same clock face, an artist can draw each of the clock designs with a graphically encoded object at the position at which the clock face belongs on the clock design. For instance, the graphically encoded object could be a circle of some uncommon color. When the graphics image is displayed, the graphically encoded objects are detected and replaced with a working clock face. Alternatively, there could be plural types of graphically encoded objects, such as a square and a circle of the uncommon color. When the application program detects the square, it would replace the square with a digital clock face and when the application program detects the circle it would replace the circle with an analog clock face. Thus, the invention enables a professional artist to draw the artistic clock designs that are combined with functional, working clock faces that are programmed by a professional programmer without requiring the programmer to write new code for each clock design. In addition, the programmer can change the clock face to be added to each clock design without having to get the artist to re-draw each clock design.

In another embodiment, the artist could draw a graphics image of an alarm clock with a graphically encoded object, such as a rectangle of a predetermined color. Instead of corresponding to an operation of displaying a replacement object, the graphically encoded object could correspond to an alarm sound being output. When the graphics image is displayed, the operation of outputting an alarm sound is performed instead of, or in addition to, replacing the graphically encoded object with a replacement object.

In a preferred embodiment, the graphics image is represented by a metafile that includes plural metafile records. Each metafile record includes a graphics function that describes the graphics image in conjunction with the graphics functions the other metafile records of the metafile. The preferred embodiment enumerates each metafile record to determine whether the metafile record corresponds to the graphically encoded object. If so, then the operation corresponding to the metafile record is performed. More detail on metafiles can be found in the Microsoft WINDOWS™ Software Development Kit, Programmers Reference, Volume 4, Chapter 3, 1992, which is incorporated by reference herein in its entirety.

FIG. 1 shows a computer system 10 used to create and respond to a graphically encoded object in a graphics image. The system 10 includes a computer 12 connected to receive input from an input device 14 and send output to an output device 16. The computer 12 can be implemented using any conventional computer, such as a conventional desktop computer. The input device 14 also is conventional and can include such items as a keyboard, a mouse, and an electronic pen and digitizing tablet. The output device 16 also is conventional and preferably includes a high resolution color display, such as a cathode ray tube (CRT) monitor, and an audio speaker.

As is conventional, the computer 12 includes a central processing unit (CPU) 18 and a memory 20. The memory 20 preferably includes a working memory, such as random access memory (RAM), and secondary memory, such as a hard disk drive or a floppy disk drive. Stored in the memory 20 is an operating system 22, an application program 24, and a drawing program 26. The operating system 22 can be any conventional operating system with a graphical user interface (GUI), such as Microsoft WINDOWS™. The application program 24 and drawing program 26 are programmed to take advantage of the GUI of the operating system 22 to provide graphical drawing and display abilities. The drawing program 26 can be any conventional drawing program, such as Aldus Freehand™.

Figure 2:
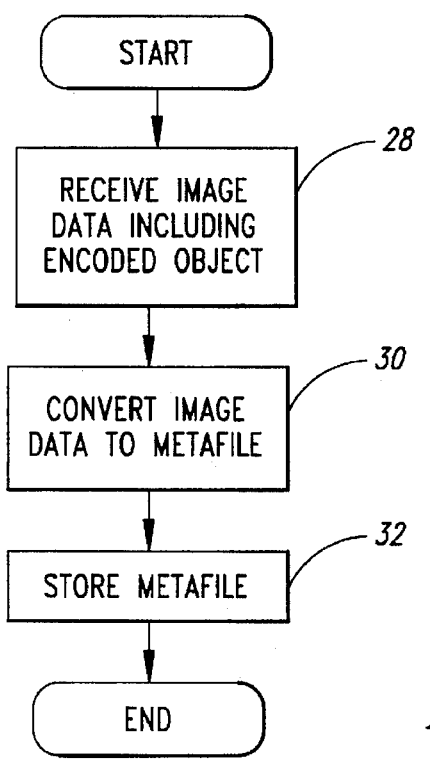
FIG. 2 is a flow diagram of a method of encoding an operation in a graphically encoded object according to the present invention.

FIG. 2 is a flow diagram of a method used by the drawing program 26 to create a graphics image with a graphically encoded object corresponding to a predetermined operation. In step 28, the drawing program receives image data corresponding to the graphics image with the graphically encoded object from the artist. As is typical in entering image data, the artist draws the graphics image using a mouse or a pen and digitizing tablet as the input device 14. The graphically encoded object can be any graphics object, but is preferably a graphics object that is distinguished by one or more uncommon features. For example, in a preferred embodiment, the graphically encoded object is a rectangle having a color that is not commonly used in creating graphics images, such as RGB (245, 250, 245). As is well known in the art, the RGB color specifies the relative amounts of red, green and blue on a scale from 0 to 255. Alternatively, the graphically encoded object can have an uncommon shape with a common or uncommon color. Preferably, the graphically encoded object includes a feature that distinguishes it from other graphics objects so that the application program doesn't perform the predetermined operation when the user actually intended that the graphic object drawn be displayed rather than triggering such a predetermined operation.

Most drawing programs typically input image data in bitmap form. In other words, the drawing programs allow the artist to specify individual pixels of the graphics image being created. However, metafiles are displayed accurately regardless of the image resolution of the display device, while bitmaps lose accuracy when the image resolution is changed. Further, representing graphics images in metafile form is preferable because it usually takes less memory space to represent a graphics image in metafile form than in bitmap form. In addition, as described in more detail below, it is easier to detect and remove a graphically encoded object when it is represented as a metafile record rather than a portion of a bitmap. As a result, in step 30, a method converts the image data from bitmap form to a metafile. In step 32, the drawing program stores the metafile in the memory 20. However, in alternate embodiments the conversion step 30 is not performed, because the graphics image remains in bitmap form.

Figure 3:
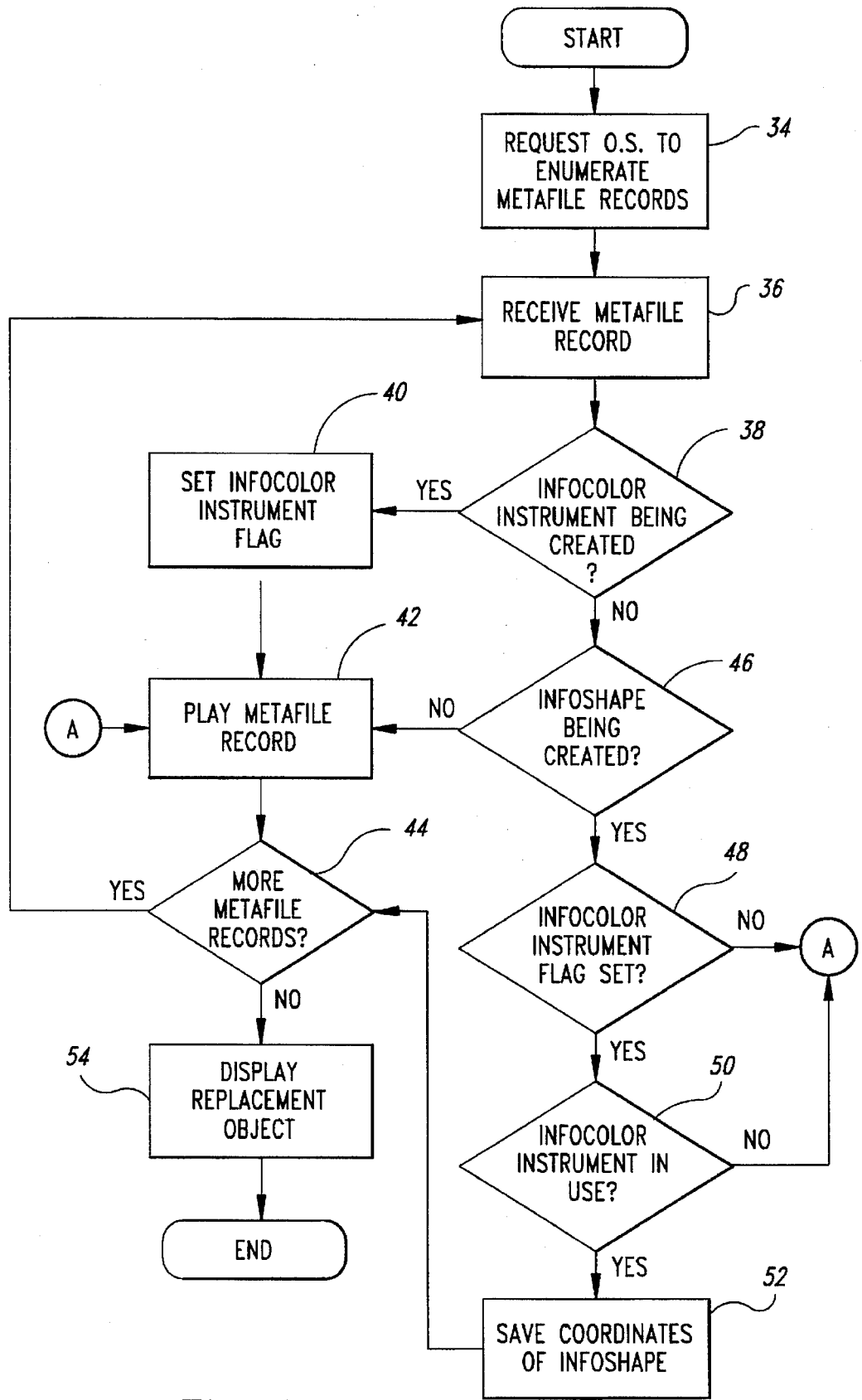
FIG. 3 is a flow diagram of a method of detecting and responding to the graphically encoding object according to the present invention.

FIG. 3 shows a method for detecting and responding to the graphically encoded object of the graphics image. In step 34, the application program 24 requests the operating system 22 to enumerate the records of the metafile representing the graphics image. Using Microsoft WINDOWS™ as the operating system 22, step 34 is accomplished by a Microsoft WINDOWS™ function called EnumMetaFile. The EnumMetaFile function instructs Microsoft WINDOWS™ to return to the requesting application program each metafile record sequentially. In step 36, the application program 24 receives a metafile record from the operating system.

In step 38, the application program determines whether a drawing instrument of the predetermined uncommon color (InfoColor) is being created. In Microsoft WINDOWS™, a metafile record must create such a drawing instrument before a graphics object can be created with that instrument. The drawing instruments vary with each operating system, but usually include one or more types of brushes and one or more types of pens. If the InfoColor instrument is being created, then in step 40 the application program 24 sets an InfoColor instrument flag indicating that the InfoColor instrument is being created. In step 42 the application program instructs the operating system 22 to play the metafile record. Playing the metafile record refers to performing the graphics function specified in the metafile record. In step 44, the method determines whether there are more metafile records and if so, the application program returns to step 36 to receive the next metafile record.

If the InfoColor instrument is not being created, then step 46 determines whether a graphic object of a predetermined shape (InfoShape), such as a rectangle or other polygon, is being created. If not, then execution proceeds to step 42 which plays the metafile record and then to step 44 to determine whether more metafile records are available. If a graphic object of the InfoShape shape is being created in step 46, then step 48 determines whether the InfoColor instrument flag is set. If not, then the metafile record is played in step 42 and step 44 determines whether there are more metafile records. If the InfoColor instrument flag is set, then step 50 determines whether the InfoColor instrument is being used to create the InfoShape graphic object. If not, then the metafile record is played in step 42 and step 44 determines whether there are more metafile records.

If the InfoColor instrument is being used to create an InfoShape graphic object, then the graphic object is a graphically encoded object. In step 52 the application program saves the coordinates of the graphically encoded object specified by the InfoShape and the InfoColor. In one embodiment, the metafile record creating the InfoShape graphic object is not played because a replacement object is displayed at the coordinates of the graphically encoded object. Alternatively, the operation corresponding to the graphically encoded object could include displaying the graphically encoded object by playing the metafile record creating the InfoShape and performing a graphical or non-graphical operation. Execution then proceeds to step 44 to determine whether more metafile records are available. When no more metafile records are available, as determined in step 44, then in step 54 the application program preferably displays the replacement object at the coordinates of the graphically encoded object.

In the embodiment shown in FIG. 3, the operation corresponding to the graphically encoded object is the display of a replacement object at the coordinates of the graphically encoded object. However, in alternate embodiments, numerous other operations can be employed. For example, in an alternate embodiment, the operation is the output of a signal to the speaker of the output device 16 causing the speaker to emit a sound such as an alarm. Alternatively, the operation could include displaying the graphically encoded object at its original coordinates and displaying a complementary graphic object at a different location. As can be appreciated, the invention allows the graphically encoded object to trigger the application program to perform any operation allowable by the computer 12.

In an alternate embodiment the graphics image and the graphically encoded object are represented by a bitmap. The operating system 22 typically does not include a function analogous to EnumMetaFile for bitmaps, so a large graphics object, such as a multi-pixel rectangle, cannot be detected easily. As such, when using the invention with a bitmap, the graphically encoded object preferably is only a small number of pixels of an uncommon color. In the clock design and clock face example discussed above, the graphically encoded object could be four pixels of the uncommon color, with one of the pixels at each of the four corners of the clock face. The application program 24 checks each pixel of the bitmap, or some logically determined subset of the bitmap, until the four pixels of the graphically encoded object are found. The application program could then perform the operation of replacing the four pixels and the pixels between the four pixels with a bitmap of the desired clock face. As a result, the invention allows the graphically encoded object to be in either bitmap or metafile form and trigger the performance of a graphics or non-graphics operation corresponding to the graphically encoded operation.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A computer-implemented method of implementing an operation encoded in a vector graphics image, comprising:
    receiving vector graphics image data corresponding to the vector graphics image, the vector graphics image data including a graphically encoded object corresponding to the operation;
    intercepting the graphically encoded object in the vector graphics image data before the graphically encoded object is displayed, wherein the intercepting step includes:
        searching a plurality of graphic objects of the vector graphics image; and
        determining which graphic object has a color that is predetermined to correspond to the operation, the graphic object having the color being the graphically encoded object; and
    performing the operation corresponding to the graphically encoded object.

2. The method of claim 1 wherein the vector graphics image includes a metafile with a metafile record corresponding to the graphically encoded object.

3. The method of claim 1, further including determining a location of the graphically encoded object within the vector graphics image and wherein the operation performed includes displaying a replacement graphic object at the location of the graphically encoded object.

4. The method of claim 1 wherein the operation performed includes outputting a sound corresponding to the graphically encoded object.

5. A computer-implemented method of implementing an operation encoded in a vector graphics image, comprising:
    receiving vector graphics image data corresponding to the vector graphics image, the vector graphics image data including a graphically encoded object corresponding to the operation;
    intercepting the graphically encoded object in the vector graphics image data before the graphically encoded object is displayed;
    determining a location of the graphically encoded object within the vector graphics image; and
    performing the operation corresponding to the graphically encoded object, wherein the operation performed includes displaying the graphically encoded object at its location and displaying a complementary graphic object at a location within the vector graphics image other than the location of the graphically encoded object.

6. A computer-implemented method of implementing an operation encoded in a vector graphics image, comprising:
    receiving vector graphics image data corresponding to the vector graphics image, the vector graphics image data including a graphically encoded object corresponding to the operation;
    intercepting the graphically encoded object in the vector graphics image data before the graphically encoded object is displayed, wherein the intercepting step includes:
        searching a plurality of graphic objects of the vector graphics image; and
        determining which graphic object has a shape that is predetermined to correspond to the operation, the graphic object having the shape being the graphically encoded object; and
    performing the operation corresponding to the graphically encoded object.

7. The method of claim 6 wherein the operation performed includes outputting a sound corresponding to the graphically encoded object.

8. A computer-implemented method of implementing an operation encoded in a graphics image represented by a metafile with metafile records, comprising:
    receiving the metafile records;
    determining whether any of the metafile records corresponds to a graphically encoded object associated with the operation; and if so, then for such metafile record, performing the operation associated with the graphically encoded object corresponding to the metafile record.

9. The method of claim 8, further including determining a location of the graphically encoded object within the graphics image and wherein the operation performed includes displaying a replacement graphic object at the location of the graphically encoded object.

10. The method of claim 8, further including determining a location of the graphically encoded object within the graphics image and wherein the operation performed includes displaying the graphically encoded object at its location and displaying a complementary graphic object at a location other than the location of the graphically encoded object.

11. The method of claim 8 wherein the determining step includes determining which metafile record represents a graphic object having a color that is predetermined to correspond to the operation, the graphic object having the color being the graphically encoded object.

12. The method of claim 8 wherein the determining step includes determining which metafile record represents a graphic object having a shape that is predetermined to correspond to the operation, the graphic object having the shape being the graphically encoded object.

13. The method of claim 8 wherein the operation performed includes outputting a sound associated with the graphically encoded object.

14. A computer system for implementing an operation encoded in a vector graphics image, comprising:

means for receiving vector graphics image data corresponding to the vector graphics image, the vector graphics image data including a graphically encoded object corresponding to an operation, wherein the vector graphics image includes a metafile with a metafile record corresponding to the graphically encoded object;

means for intercepting the graphically encoded object in the vector graphics image data before the graphically encoded object is displayed; and means for performing the operation corresponding to the graphically encoded object.

15. The system of claim 14, further including means for determining a location of the graphically encoded object within the vector graphics image and wherein the performing means includes means for displaying a replacement graphic object at the location of the graphically encoded object.

16. The system of claim 14 wherein the performing means includes means for outputting a sound corresponding to the graphically encoded object.

17. A computer system for implementing an operation encoded in a vector graphics image, comprising:

means for receiving vector graphics image data corresponding to the vector graphics image, the vector graphics image data including a graphically encoded object corresponding to an operation;

means for intercepting the graphically encoded object in the vector graphics image data before the graphically encoded object is displayed; and means for determining a location of the graphically encoded object within the vector graphics image; and means for performing the operation corresponding to the graphically encoded object, wherein the performing means includes means for displaying the graphically encoded object at its location and means for displaying a complementary graphic object at a location other than the location of the graphically encoded object.

18. A computer system for implementing an operation encoded in a vector graphics image, comprising:

means for receiving vector graphics image data corresponding to the vector graphics image, the vector graphics image data including a graphically encoded object corresponding to an operation;

means for intercepting the graphically encoded object in the vector graphics image data before the graphically encoded object is displayed; and means for performing the operation corresponding to the graphically encoded object;

wherein the intercepting means includes:

means for searching a plurality of graphic objects of the vector graphics image; and means for determining which graphic object has a color that is predetermined to correspond to the operation, the graphic object having the color being the graphically encoded object.

19. A computer system for implementing an operation encoded in a vector graphics image, comprising:

means for receiving vector graphics image data corresponding to the vector graphics image, the vector graphics image data including a graphically encoded object corresponding to an operation;

means for intercepting the graphically encoded object in the vector graphics image data before the graphically encoded object is displayed; and means for performing the operation corresponding to the graphically encoded object;

wherein the intercepting means includes:

means for searching a plurality of graphic objects of the vector graphics image; and means for determining which graphic object has a shape that is predetermined to correspond to the operation, the graphic object having the shape being the graphically encoded object.

20. A computer-readable memory device that includes a program for controlling a computer to implement an operation encoded in a vector graphics image, the program comprising instructions for:

receiving vector graphics image data corresponding to the vector graphics image, the vector graphics image data including a graphically encoded object corresponding to an operation;

intercepting the graphically encoded object in the vector graphics image data before the graphically encoded object is displayed, wherein the intercepting instructions include:

instructions for searching a plurality of graphic objects of the vector graphics image; and instructions for determining which graphic object has a shape that is predetermined to correspond to the operation, the graphic object having the shape being the graphically encoded object; and performing the operation corresponding to the graphically encoded object.

21. The memory device of claim 20, further including instructions for determining a location of the graphically encoded object within the vector graphics image and wherein the performing instructions include instructions for displaying a replacement graphic object at the location of the graphically encoded object.

22. The memory device of claim 20 wherein the performing instructions include instructions for outputting a sound corresponding to the graphically encoded object.

23. A computer-readable memory device that includes a program for controlling a computer to implement an operation encoded in a vector graphics image, the program comprising instructions for:

receiving vector graphics image data corresponding to the vector graphics image, the vector graphics image data including a graphically encoded object corresponding to an operation wherein the vector graphics image includes a metafile with a metafile record corresponding to the graphically encoded object;

intercepting the graphically encoded object in the vector graphics image data before the graphically encoded object is displayed; and performing the operation corresponding to the graphically encoded object.

24. A computer-readable memory device that includes a program for controlling a computer to implement an operation encoded in a vector graphics image, the program comprising instructions for:

receiving vector graphics image data corresponding to the vector graphics image, the vector graphics image data including a graphically encoded object corresponding to an operation;

intercepting the graphically encoded object in the vector graphics image data before the graphically encoded object is displayed;

determining a location of the graphically encoded object within the vector graphics image; and performing the operation corresponding to the graphically encoded object, wherein the performing instructions include instructions for displaying the graphically encoded object at its location and instructions for displaying a complementary graphic object at a location other than the location of the graphically encoded object.

25. A computer-readable memory device that includes a program for controlling a computer to implement an operation encoded in a vector graphics image, the program comprising instructions for:

receiving vector graphics image data corresponding to the vector graphics image, the vector graphics image data including a graphically encoded object corresponding to an operation;

intercepting the graphically encoded object in the vector graphics image data before the graphically encoded object is displayed; and performing the operation corresponding to the graphically encoded object;

wherein the intercepting instructions include:

instructions for searching a plurality of graphic objects of the vector graphics image; and instructions for determining which graphic object has a color that is predetermined to correspond to the operation, the graphic object having the color being the graphically encoded object.

* * * * *